Nov. 30, 1948.  J. R. PIERCE  2,455,269
VELOCITY VARIATION APPARATUS
Filed Nov. 17, 1942  3 Sheets-Sheet 1

INVENTOR
J. R. PIERCE
BY
E. V. Griggs
ATTORNEY

Nov. 30, 1948.　　　　　J. R. PIERCE　　　　　2,455,269
VELOCITY VARIATION APPARATUS

Filed Nov. 17, 1942　　　　　　　　　　　　　3 Sheets-Sheet 2

$\omega T = (2n+1)\pi$

CURRENT INDUCED IN CAVITY (OR CIRCUIT) 26 BY PASSAGE
OF CHARGE ACROSS SUCCESSIVE TANDEM-CONNECTED INPUT GAPS $\omega T = 2n\pi$ CURRENT INDUCED IN CIRCUIT (OR CAVITY) 53 BY PASSAGE
OF CHARGE ACROSS SUCCESSIVE MULTIPLE-CONNECTED INPUT GAPS.

INVENTOR
J. R. PIERCE
BY
E. V. Griggs
ATTORNEY

Nov. 30, 1948.　　　　　J. R. PIERCE　　　　　2,455,269
VELOCITY VARIATION APPARATUS

Filed Nov. 17, 1942　　　　　　　　　　　　　3 Sheets-Sheet 3

INVENTOR
J. R. PIERCE
E. V. Griggs
ATTORNEY

Patented Nov. 30, 1948

2,455,269

UNITED STATES PATENT OFFICE 2,455,269

VELOCITY VARIATION APPARATUS

John R. Pierce, Millburn, N. J., assignor to Bell Telephone Laboratories, Incorporated, New York, N. Y., a corporation of New York Application November 17, 1942, Serial No. 465,843

9 Claims. (Cl. 315—6)

This invention relates to electron discharge apparatus and more particularly to electron beam discharge devices of the velocity variation type.

A principal object of the invention is to reduce the spurious or "noise" signals which hamper the operation of velocity variation devices. Another object is to provide adjustments which contribute to the optimum efficacy in operation of such devices.

A serious shortcoming of velocity variation devices in general, lies in the fact that they are excessively "noisy"; that is to say, the output currents of such devices are accompanied by large unwanted disturbances. A principal source of such noise is that the electron stream entering the input region of the device is not a homogeneous stream of uniform velocity and density but is, on the contrary, characterized by spurious and random current variations. The noise energy contained in these current variations of the injected stream is transferred by induction to the input resonator where it distorts the input frequency electromagnetic fields and so impresses corresponding velocity variations on the stream as it emerges from the input region and starts its travel toward the output region.

In velocity variation devices a common expedient for imparting the velocity variations to the electron stream in the input region consists of a pair of gaps spaced apart along the path of the electron stream, coupled to a suitable resonant system, and so supplied with energy from the resonant system as to assure the occurrence of cumulative effects at the successive gaps. To accomplish this the phase relation of the electric fields in the two gaps, the distance between the gaps and the average electron velocity between them are so correlated that an electron which is accelerated in the first gap is also accelerated in the second gap and an electron which is retarded in the first gap is further retarded in the second. Examples of such operation are shown in Hahn Patents 2,220,839, November 5, 1940 and 2,222,902 November 26, 1940. In the showing of the former the fields of the two input gaps are 180 degrees out of phase and for cumulative effect the electron transit time between the gaps is made equal to one half cycle at the input frequency or an odd multiple thereof while in the showing of the latter patent the fields in the two input gaps are in phase and for cumulative effect the electron transit time between them is made equal to a whole number of cycles.

The applicant has discovered that by a different selection of the transit time between the input gaps (such that the effects in the two gaps are not cumulative) the input resonant system may be rendered insensitive to the current variations in the injected electron stream which as previously mentioned ordinarily give rise to noise in the output of the device. Thus the principal source of noise in the output current of the apparatus as a whole may be eliminated.

Electron transit time or charge transit time is often denoted for convenience in terms of cycles or angles at the operating frequency. It is then more properly referred to as transit angle and is usually measured in either cycles or radians. Electron (or charge) transit time (or angle) between two points, in terms of cycles, is equal to the distance between the points divided by the electron (or charge) velocity and multiplied by the operating frequency. This result in terms of cycles may be further multiplied by $2\pi$ to obtain the time (or angle) in terms of radians.

In pursuance of the objects of the invention and in accordance with the above discovery, the transit angle between the two input gaps is so adjusted that noise currents induced in the input resonator by passage of electrons across the second gap are equal and opposite to noise currents induced therein by passage of the same electrons across the first gap. It is a consequence of this adjustment that oscillation input impulses at the two gaps, instead of being cumulative as in the prior art, are in substantially exact opposition, so that the electron stream emerges from the input region largely devoid of velocity variations. It has, however, substantial density variations due to drift action between the first gap and the second, and input oscillation frequency energy may be abstracted therefrom by a suitable output system in well-known manner.

The novel transit angle adjustment has, of course, different values for different structures. For example, in the structure of Hahn Patent 2,220,839, above described, in which, at any instant, the fields in the two gaps are of opposite sign, the transit angle should be adjusted to a whole number of full cycles, instead of to an odd number of half cycles as dictated by the prior art. In the structure of Hahn Patent 2,222,902, above described, wherein the fields in the two gaps at each particular instant are of the same sign, the transit angle is to be adjusted to an odd number of half cycles at the signal frequency, instead of to an even number of whole cycles as dictated by the prior art.

It is not essential to the practice of the invention that the transit angles across the two successive input gaps individually be short, but only that the currents induced in the input circuit coupled thereto by passage of each electron across them be alike. It is therefore possible to employ input gaps which, quite apart from the magnitude of the transit angle which separate them, have individual transit angles which are fairly long. While this reduces somewhat the efficacy of the energy transfer from the field across the gap to the electron stream and vice versa, this disadvantage is outweighed by the substantial reduction of interelectrode capacitance which results from the use of long gaps. As the gaps are still further increased in length this compensating advantage diminishes in importance and the efficacy of energy transfer becomes the controlling factor. It is therefore a feature of the invention and a part of the teaching hereof to provide input and output gaps whose individual electrical lengths are adjusted to optimum values.

The invention, which in one aspect consists of a novel adjustment of known apparatus which results in a novel mode of operation, will be fully understood from the following description.

Figure 1:
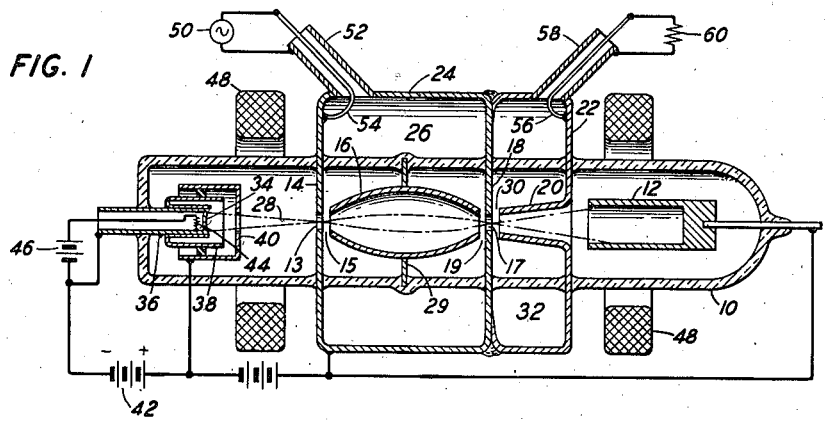
Fig. 1 is a cross section of a discharge device in accordance with the invention.

Referring now to the figures, the electron discharge device of Fig. 1 comprises an evacuated envelope of dielectric material having mounted therein an electron gun at one end, a target anode 12 at the other, and a plurality of gap-defining electrodes 14—20 between. Certain ones of these electrodes may be simple apertured discs 14, 18 which protrude through the vessel wall 10, being sealed thereto in air-tight fashion. They may be connected together externally of the vessel by a cylindrical member 24 which may be integral therewith and which, with the tube 16 and the discs 14, 18 forms a resonant cavity 26. The tube 16 may be mounted on a disc 29 which is supported in any desired manner, for example by sealing to the vessel wall 10. It may be tapered from the center toward both ends, as shown, to define with the apertures 13, 17 of the discs 14, 18 two input gaps 15, 19 of small cross section, onto which the electron beam 28 may be focused as hereinafter described. However, such focusing is not essential, and the gaps 15, 19 may be of large or small cross section and the tube 16 tapered or cylindrical, as desired.

Beyond the second input gap 19 along the path of the electron stream 28 there is placed another tubular member 20 connected to the disc 22 and which, with the disc 18, defines an output gap 30 and to which is coupled an output cavity resonator 32. Thus, the input and output cavity resonators 26, 32 have a common partition 18. This arrangement is preferred since it facilitates focusing, though if desired, the input and output cavity resonators may be entirely separate.

The electron gun may be of any desired construction. For example, it may consist of a concave cathode surface 34, mounted on a sleeve 36 and surrounded by a tubular shield 38 and followed by an apertured accelerating anode 40, maintained, in operation, at a suitable positive potential with respect to the cathode 34, as by a source 42. The cathode may be heated by a resistor element 44 to which current may be supplied as from a source 46.

The gun arrangement shown may be adjusted in accordance with known principles to direct electrons from substantially all parts of the cathode surface 34 in a stream 28 upon the first input gap 15. To focus the beam 28, in turn, on the second input gap 19 any suitable means may be employed; for example, coils 48 mounted externally of the device and supplied with current adjusted to produce an axial magnetic field.

After passing the output gap 30 the electron stream 28 passes on to be collected by the target anode 12. The latter may be maintained at the potential of the gap electrodes and may have the form of an open-ended tube in order to prevent the withdrawal of secondary electrons from the anode 12 toward the gap electrodes.

Oscillation input energy may be applied to the input cavity resonator 26 in any desired manner, for example, from a suitable high frequency signal source 50 and by way of a coaxial line section 52 and magnetic coupling loop 54. Likewise output energy may be withdrawn from the output cavity resonator 32 by way of a coupling loop 56 and a coaxial line section 58 and thereby delivered to any suitable load, schematically indicated in the figure by a resistor 60.

Figure 2:
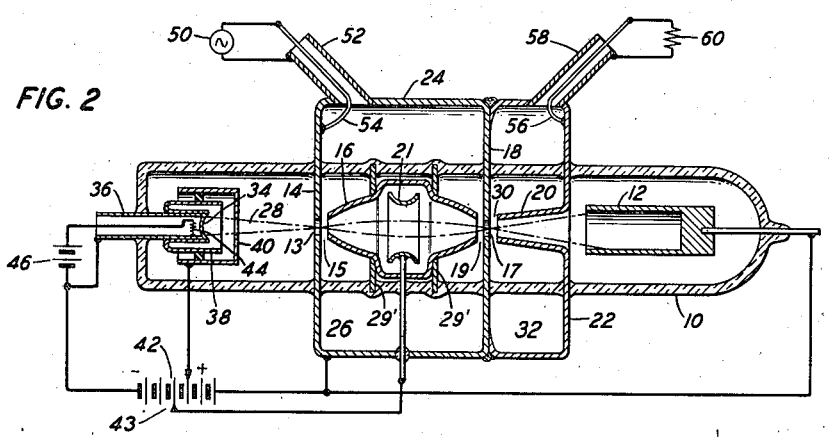
Fig. 2 is a cross section of a modification of Fig. 1.

Fig. 2 is broadly similar to Fig. 1, and like parts are designated by like reference characters. The principal difference between Fig. 2 and Fig. 1 lies in the provision for electrostatic focusing instead of magnetic, and for reducing the average beam speed in the tube 16. To this end an annular electrode 21 may be provided centrally of the tube 16, maintained at a reduced potential, as by connection to an intermediate point 43 of the battery 42, with respect to the tube 16. Electron lenses are formed on each side of this annulus 21 so that the stream 28 after crossing the first input gap 15 and starting to diverge, is brought to a focus on the second input gap 19. Additionally, by reason of its lower potential, the annulus 21 reduces the speeds of all electrons and thus permits the use of a tube 16 of shorter geometrical length for a given electrical length or transit angle and a given stream velocity, and improves the transadmittance of the device for any given transit angle.

Figure 3:
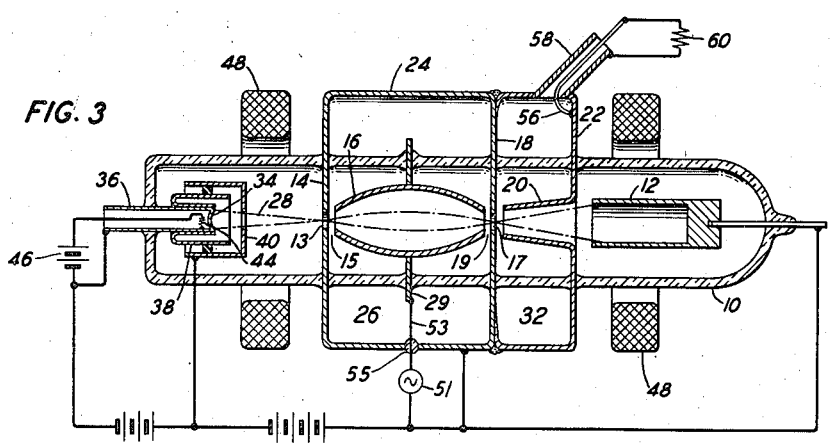
Fig. 3 is a cross section of another modification of Fig. 1.

Fig. 3 shows another modification which is broadly similar to Fig. 1 and similar parts are designated by like reference characters. The principal difference lies in the arrangement of the input system which in this case is arranged for oscillation in a different mode from that of Fig. 1, input energy being applied to the inner tubular member 16 as by a high frequency oscillation source 51 whose terminals are connected by way of a conductor 53 and the supporting disc 29 to the mid-point of the inner tube 16. The conductor 53 passes through a suitably placed small insulated aperture 55 in the cavity wall 24 to a convenient point of the outer surface of this wall. Inasmuch as the currents in a closed cavity structure of the type shown are restricted to the outer wall of the inner member 16 and the inner wall of the outer member, the point of connection of the generator 51 to the outer wall of the outer cylindrical member 24 is by no means critical, although it is important that the other generator terminal be connected close to the mid-point of the tube 16.

Figure 4:
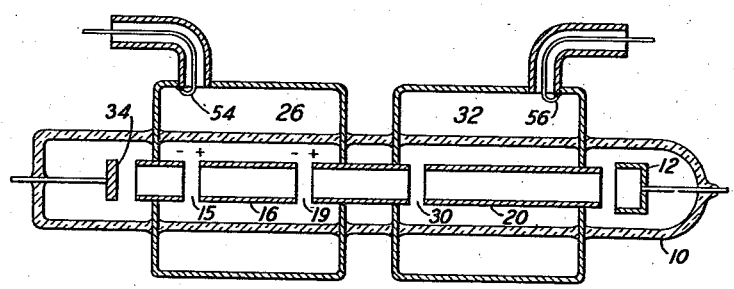
Fig. 4 is a simplified schematic view of the essential elements of Figs. 1 and 2.
Figure 5:
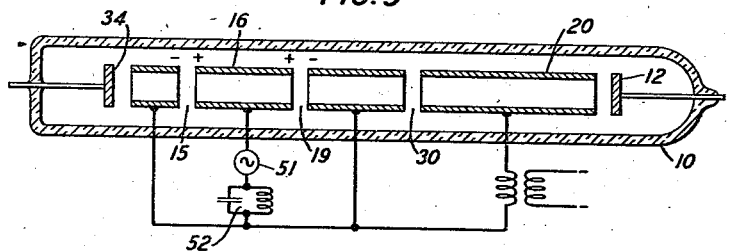
Fig. 5 is a simplified schematic view of the essential elements of Fig. 3.

The manner in which the structures of the invention are adjusted for operation in accordance with the invention is best explained in terms of Figs. 4 and 5 which show the gap arrangements of Figs. 1, 2 and 3 in simplified diagrammatic form. Thus, when input frequency energy is applied by way of the coupling loop 54 to the input cavity 26 oscillations will take place within the cavity. In the simplest mode these oscillations are such that at any instant the voltage drops across the first and second input gaps 15, 19 are in phase with each other. The system may also oscillate in a different mode when so excited, although, if such different mode is preferred, it is desirable that it be made the only mode by modifying the circuit arrangement as shown in Fig. 3. With the latter arrangement the two ends of the inner tube 16 remain always at like potentials although they change with time, while the opposite end walls of the input cavity 26 are at every instant of opposite potentials therefrom. When the oscillations of this arrangement take place in the simplest manner, the potentials of all points of the outer conductor 24, including its terminal discs 14, 18 may be uniform and constant in time at a radio frequency ground potential, while the inner tube 16 may be an equipotential surface. Operation in this manner may be secured with gap-defining electrodes which are intercoupled with circuits of lumped constants 52, in the manner indicated in Fig. 5. However, when tuning is effected by cavity resonators as shown in Fig. 3, operation in the sense of the invention is substantially unimpaired if the system behaves like a half-wave coaxial line, with the driving force at the mid-point. This only means that there is a considerable phase displacement between the signal as delivered by the source 51 and the radio frequency field appearing at the input gaps 15, 19.

Referring now to Fig. 4, which shows the arrangement of Figs. 1 and 2 in simplified schematic form, plus and minus signs have been employed to designate the polarities of the fields at the two input gaps 15, 19 at a particular instant of time. With the polarities as shown, i. e., with the fields at the two gaps in phase, the transit angle across the input region, that is, from the first gap 15 to the second gap 19, should be adjusted to an odd number of half cycles at the signal frequency, and preferably a fairly large odd number, for example, at frequencies of the order of 3,000 megacycles per second, 4½ cycles to 8½ cycles or thereabouts. The optimum value of this transit angle will increase with input frequency. With this adjustment an electron which receives a forward velocity increment at the first gap 15 receives a substantially equal negative velocity increment at the second gap 19 so that it emerges from the input means with its original velocity of entrance substantially unaltered. With the arrangement of Fig. 3, on the other hand, schematically represented in Fig. 5, the fields at the two input gaps 15, 19 are at all times opposite in sign, and the transit angle between these gaps is to be adjusted to a whole number of full cycles at the signal frequency. Suppose an electron were to pass the first gap 15 at an instant when the field across it is aiding and to receive a positive velocity increment therefrom. At this instant, the field across the second gap 19 is a retarding field, and a full cycle later or any whole number of full cycles later, it will again be a retarding field, so that when the electron which has received a positive velocity increment at the first gap 15 crosses the second gap 19 it will receive an equal and opposite negative velocity increment and emerge from the input region with a net velocity change of zero, i. e., with its original entrance velocity.

The drift action which takes place between the first input gap 15 and the second input gap 19 may be made as great as desired by the use of a long electron transit angle therein. Thus, before the velocity variations imparted at the first gap 15 are nullified by the second, substantial bunching or grouping, resulting in density variations of the stream may take place by drift action, so that the electron stream which emerges from the input region, i. e., which has passed both gaps of the resonance chamber 26, although nearly devoid of velocity variations, contains substantial density variations. The stream, bearing these density variations, then travels to and through the output gap 30 where the transmitted energy contained in the density variations is delivered to the electromagnetic field within the output cavity resonator 32 in well-known manner and may be withdrawn therefrom as by the coupling loop 56 for utilization.

The manner in which the adjustments in accordance with the invention produce results in the elimination of noise will now be explained. Consider the systems of Figs. 1 and 4 in the absence of impressed input oscillations, and, in particular, consider the effects of a single electron crossing the two input gaps 15, 19 in succession and passing from the first to the second at normal speed. As the electron crosses the first gap 15 it will induce a current pulse in the circuit connected thereto, i. e., in the input cavity resonator 26. At a later time, when it crosses the second gap 19 it will induce another current pulse. The gaps 15, 19 being of equal length and like geometry, the current pulses will be of like magnitude, and inasmuch as the gaps are connected in tandem they will be of like sign.

Each of these current pulses, being a transient phenomenon, may be conceived of as consisting of an infinitude of components of different frequencies. In particular, each will have a component of the input oscillation frequency to which the system is resonant.

Now, when the transit angle between the first gap 15 and the second gap 19 is adjusted to an odd number of half cycles at this resonant frequency, these input frequency components of the two current pulses occur in opposite phase so that the second one nullifies the first, leaving no net current induced in the circuit at the resonant or signal frequency.

Of course, certain other frequency components of these two current pulses will be additive instead of subtractive; but this is of comparatively small interest because the system is sharply tuned to transmit only a narrow band of frequencies centered at the input frequency and extending for a short distance on each side thereof.

Figure 4A:
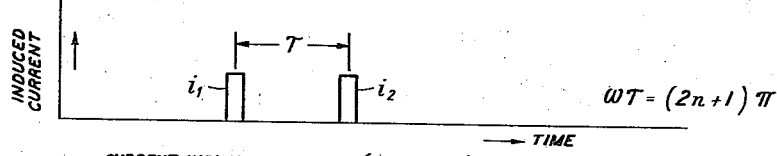
Fig. 4A is a diagram of assistance in understanding the operation of Figs. 1, 2 and 4.

This simple explanation may be reduced to quantitative form in the following manner. Referring to Fig. 4A and designating the first current pulse by $i_1$ and the second current pulse by $i_2$, it is known that a current pulse of the form shown may be represented as a sum of terms of the form $$i_1 = \Sigma A_{1\omega} \cos \omega t \qquad (1)$$

where $A_{1\omega}$ measures the amplitude of the component of a generalized periodicity $\omega$ and $t$ is time. Similarly, the second current pulse $i_2$, which occurs later in time by the transit time $\tau$ may be represented by the summation $$i_2 = \Sigma A_{2\omega} \cos \omega(t-\tau) \qquad (1a)$$

Inasmuch as the current pulses $i_1$ and $i_2$ are alike in magnitude, the coefficients $A_{1\omega}$ and $A_{2\omega}$ are alike, and since the current pulses are of the same sign, the total induced current may be represented by the sum of the two separate induced currents $i_1$ and $i_2$, or $$I = i_1 + i_2 = \Sigma A_\omega [\cos \omega t + \cos \omega(t-r)] \qquad (2)$$

Disregarding components which the system cannot transmit, i. e., retaining from the summation only the terms of input periodicity $\omega_0$ and using the substitution $\theta = \omega \tau$ where $\theta$ is the transit angle in radians between the first input gap and the second, the total signal frequency induced current is $$I = A_{\omega 0}[\cos \omega_0 t + \cos(\omega_0 t - \theta)] \qquad (3)$$

Now if $$\theta = (2n+1)\pi \text{ radians}, \cos(\omega_0 t - \theta) = \cos(\omega_0 t - (2n+1)\pi) = -\cos \omega_0 t$$

so that the above Equation (3) reduces to $$I = A_{\omega 0}(\cos \omega_0 t - \cos \omega_0 t) = 0 \qquad (4)$$

wherefrom it appears that the net current induced in the circuit vanishes.

Figure 5A:
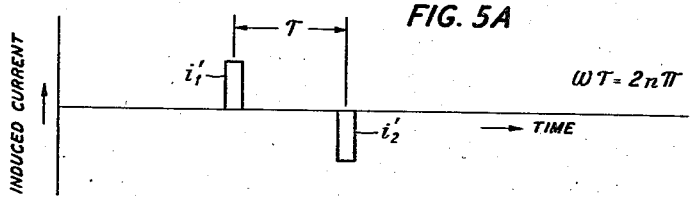
Fig. 5A is a diagram of assistance in understanding the operation of Figs. 3 and 5.

The mode of operation of the system of Figs. 3 and 5 is much the same, the difference being that since the first and second input gaps 15, 19 are connected in multiple instead of in tandem, an electron crossing the first gap 15 which induces a positive current pulse $i'_1$, (Fig. 5A) in the input circuit 51 will induce a negative pulse $i'_2$ of like magnitude and at a later time when it crosses the second gap 19. This difference requires that for nullification of the induced current the transit angle between the first gap and the second be adjusted to a whole number of full cycles at the signal frequency, that is, to the value $2n\pi$ radians. Referring to Fig. 5A and using definitions and symbols as employed above in connection with the analysis of Figs. 1 and 3, it can be shown similarly by taking account of the different polarities of $i'_1$ and $i'_2$ and making $\theta = 2n\pi$ radians that $$I'_{\omega 0} = A_{\omega 0}(\cos \omega_0 t - \cos \omega_0 t) = 0$$

and the signal frequency component of the induced circuit current vanishes as before.

Since cancellation of induced currents is effective for a single arbitrarily selected electron, it is effective for all electrons, so that induction of noise currents in the input cavity resonator 26 is effectively eliminated.

The above analysis is given in the absence of input oscillations. The relations developed above cease to hold with exactness when oscillations are impressed on the input system because the transit time $\tau$ will now no longer be a constant quantity but will be greater than the original value for those electrons which have been retarded and less than the original value for those electrons which have been accelerated by the first of the two input gaps. For weak incoming waves, however, this deviation will be small so that a favorable signal-to-noise ratio may be preserved.

The principal features of the invention have been explained in connection with apparatus in which the two successive input gaps are assumed to be short, i. e., the electric field across any gap does not change noticeably during the short interval that an electron is in this gap. This, however, is by no means a necessary limitation. It is evident that cancellation or nullification of the signal frequency component of the noise currents induced in the circuit or cavity resonator coupled to the input gaps may be secured equally well when the transit angles across these gaps individually are not short. In other words, as long as the transient pulses of Figs. 4A and 5A due to the passage of an electron across the two successive input gaps 15, 19 are of the same magnitude and wave form, this cancellation may be secured. In such case the transit angle between the gaps may be measured from the central plane of the first gap to the central plane of the second gap. Thus it is possible to practice the invention with comparatively long input gaps and, indeed, with a comparatively long output gap. This expedient may, under certain conditions, be advantageous, for reasons now to be explained.

With every input gap there is associated a conversion coefficient or gap efficacy factor herein designated M, which measures the efficacy of the conversion from signal voltage across the gap to velocity variations imparted to the electron stream within the gap. The value of this coefficient is unity for an infinitesimal gap and thereafter approximately follows the law $$M = f(D) \frac{\sin \frac{\theta_g}{2}}{\frac{\theta_g}{2}} \qquad (5)$$

In this expression, $\theta_g$ is the transit angle in radians between two planes which coincide, respectively, with the ends of the electrodes which define the gap, and $f(D)$ is a factor whose value depends on the gap width in a direction perpendicular to the electron flow. This factor is unity when the gap is defined by grids and is somewhat less than unity when the gap is defined by open-ended tubes as in the preferred arrangements hereinabove described. The coefficient M of Equation 5 is well known in the art. For instance, the expression (5) (for a grid defined gap where $f(d) = 1$) may be obtained from "Electron Inertia Effects" by F. B. Llewellyn (Cambridge University Press, 1941), page 41, equations 4.15 and 4.16 letting the current and space charge be small.

In a velocity variation amplifier such a coefficient enters twice, in the input gap relating the input voltage to the energy imparted to the electrons, and in the output gap, relating the electron current in the density varied electron stream to the current induced in the output circuit. Thus, calling the coefficients for the input and output gaps $M_1$ and $M_2$, respectively, a factor $M_1 M_2$ will appear in the transadmittance. The magnitude of the transadmittance may thus be expressed $$|Y_m| = N M_1 M_2 \qquad (6)$$

where N is a factor depending on the current, voltage and geometry of the drift space. It is well known that when the space charge is not too large $$N = \frac{I_0 \Theta}{2V_0} \quad (7)$$

where $I_0$ is the direct electron beam current, $\Theta$ is the transit angle in radians across the drift space and $V_0$ is the direct beam voltage.

From the above expression (5) it is evident that, for a given stream velocity, this coefficient decreases as the gap length is increased. Therefore, from the standpoint of the coefficient M, it is desirable that the electrodes which define the gap be closely spaced.

With the input gap there is also associated a capacitance $C_g$ between the two electrodes which define the gap, which capacitance, in effect, shunts the input signal. If the electrodes are too close together, this capacitance and its shunting effect will be large. From the standpoint of this capacitance, it is therefore desirable that the electrodes be widely spaced. To a first approximation, the capacitance between the electrodes is inversely proportional to the spacing between them and, therefore, for a given electron stream speed, inversely proportional to the transit angle across the gap.

Thus for a given electron stream velocity, the requirements of the coefficient M dictate the use of a short gap while the requirements of the shunt capacitance dictate the use of a long gap. The same considerations apply for each of a plurality of input gaps and for the output gap.

Applicant has discovered by analytical methods that the power transfer ratio in a velocity variation device from the signal input terminals to the signal output terminals contains for each gap the factor $$\frac{M^2}{C_g}$$

Therefore to obtain maximum power transfer, it is desirable that this quantity have a maximum value.

Figure 6:
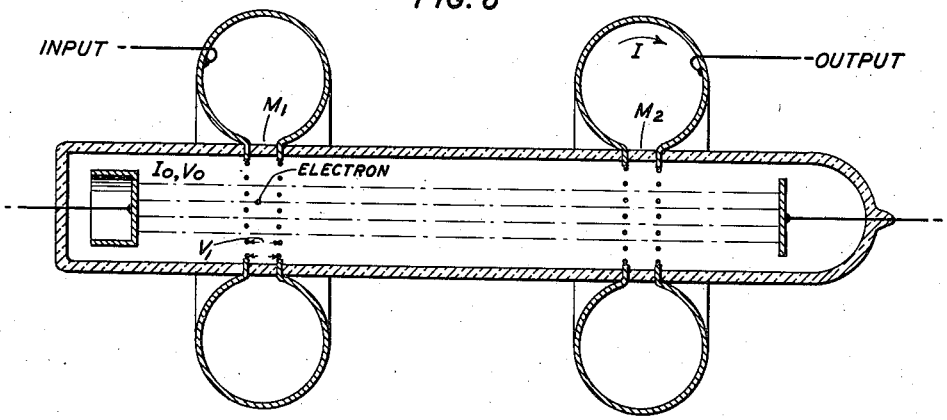
Fig. 6 is a simplified cross section of a velocity variation device of assistance in connection with the explanation of a subsidiary feature of the invention.
Figure 6A:
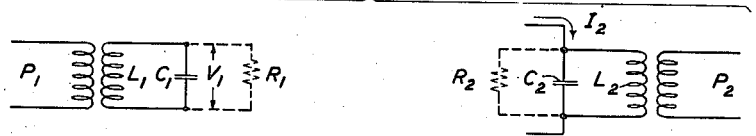
Fig. 6A is an equivalent circuit diagram of Fig. 6.

This may be shown in the following manner:

Fig. 6 is an idealized diagram of a velocity variation device including an input gap and an output gap, each coupled to and tuned by a cavity resonator. In Fig. 6A, below the resonators are shown their equivalent circuits in terms of lumped constants.

Turning now to the equivalent circuits of Fig. 6A, their significance lies in power transfer considerations. In each of these equivalent circuits the capacitance C exists principally between the electrodes which define the gaps, the inductance L is due principally to the conductive inner walls of the cavity resonator and R is the effective resistance of the coupled system due to its losses, etc. It is known from coupled circuit theory that if power is fed into this system as shown, resulting in an input voltage $V_1$, the resulting power input is $$P_1 = \frac{V_1^2}{R_1} \quad (8)$$

It is also known that the effective resistance $R_1$ is given by $$R_1 = \frac{Q}{2\pi f_0 C_1} \quad (9)$$

where $f_0$ is the resonant frequency. Since, in this expression $$Q = \frac{f_0}{\Delta f} \quad (10)$$

where $\Delta f$ is the effective frequency band width $$R_1 = \frac{1}{2\pi C_1 \Delta f} \quad (11)$$

Likewise, the power delivered to the effective output resistance $R_2$ is given by $$P_2 = I_2^2 R_2 \quad (12)$$

where $I_2$ is the effective circuit current. As before $$R_2 = \frac{1}{2\pi C_2 \Delta f} \quad (9a)$$

where $C_2$ is the capacitance of the output gaps. The ratio of the output power $P_2$ to the input power $P_1$ is $$\frac{P_2}{P_1} = \frac{I_2^2 R_2}{\frac{V_1^2}{R_1}} = \frac{I_2^2 R_1 R_2}{V_1^2} \quad (13)$$

But, from (6), in the output circuit current in the velocity variation system is $$I_2 = M_1 M_2 N V_1 \quad (14)$$

and therefore $$\frac{P_2}{P_1} = M_1^2 M_2^2 N^2 R_1 R_2 \quad (15)$$

$$= \frac{M_1^2}{2\pi C_1 \Delta f} \cdot \frac{M_2^2}{2\pi C_2 \Delta f} N^2 \quad (16)$$

from which it is plain that, for a given frequency band width and a given velocity-to-current conversion factor N, the power transfer is a maximum when the quantities $$\frac{M_1^2}{C_1} \text{ and } \frac{M_2^2}{C_2} \quad (17)$$

have their greatest values. Inasmuch as they are mutually independent, a partial maximum is obtained when either one, taken singly, has its greatest value.

Figure 7:
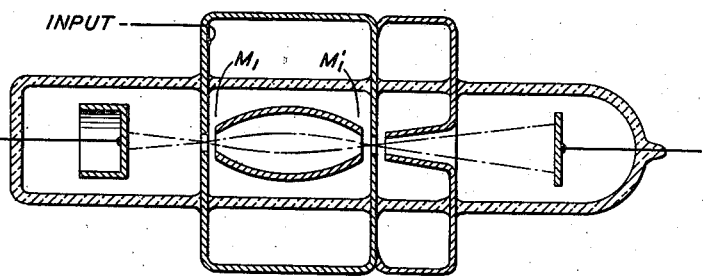
Fig. 7 is a simplified cross section of apparatus similar to Fig. 1, illustrating the embodiment therein of the subsidiary feature.
Figure 7A:
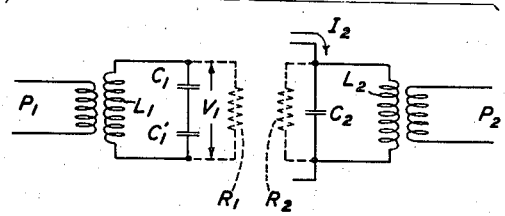
Fig. 7A is an equivalent circuit diagram of Fig. 7.

The above explanation has been given in full for the reason that the relations developed above are of use quite apart from the employment of a doubled input gap or other means for reducing noise in accordance with the aspect of the invention first described above. It is equally applicable to the doubled input gap as will be seen from a consideration of Figs. 7 and 7A, which are simplified diagrams of a velocity variation system including the noise elimination feature, and equivalent circuits of lumped constants therefor, respectively. The velocity variations are imparted in the first input gap, with which is associated a coefficient $M_1$ and they are nullified in the second gap with which is associated a similar coefficient $M_1'$. The capacitances $C_1$ and $C_1'$ are in series in the circuit.

Therefore, instead of the expression $$\frac{M^2}{C}$$

which from (17) is to be maximized for a single input gap, there is obtained the expression $$\frac{M^2}{\frac{C_1 C_1'}{C_1 + C_1'}} \quad (18)$$

to be maximized for the double input gap. The simplest way of effecting nullification of velocity variations and consequent noise elimination is to arrange that the input structure be symmetrical, in which case $$C_1 = C_1'$$

and $$\frac{C_1 C_1'}{C_1 + C_1'} = \frac{1}{2} C_1$$

In this event the factor to be maximized becomes $$\frac{M^2}{\frac{1}{2}C_1} \qquad (18a)$$

Since this expression differs from the former one only by a constant, it evidently reaches its maximum for the same value of the gap transit angle $\theta_g$.

Inasmuch as the variations of both $M$ and $C_g$ with gap transit angle are known, it is possible to find the maximum value of the factor $$\frac{M^2}{C_g}$$

When the gap is defined by grids, this maximum value occurs for a gap transit angle of 2.4 radians, for which, from the formula given above, $M^2 = .62$, or $M = .79$. The same considerations dictate the use of an output gap whose transit angle is of the order of 2.4 radians for optimum efficacy of power transfer to the output resonant cavity. When, as in the embodiments shown, the gaps are not defined by grids, the relations are less simple and exact but are not substantially different.

Two principal structures embodying the invention have been described. It is evident that many modifications can be made employing different circuits and different numbers of gaps. If such variations be made, they should preferably be made without departing from the relation that the net velocity variation produced by the input gaps should be zero, in which case noise currents induced in the input circuit or other resonant means by the passage of electrons through the successive input gaps is likewise zero.

What is claimed is:

1. High frequency translating apparatus which comprises means within an enclosing envelope for projecting a stream of moving charges along a prescribed path at a substantially uniform velocity, a resonator tuned to a desired oscillation frequency, means disposed along said path and coupled to said resonator for imparting velocity variations to said stream in accordance with an input electromotive force coupled to said resonator, means disposed along said path beyond said first-named velocity variation means and similarly coupled to said resonator for imparting to said stream velocity variations which are equal in magnitude to said first-imparted velocity variations and in a given phase relation thereto and whereby current is induced in said resonator by the passage of charges past each of said velocity variation means, the distance between the two said velocity variation means along the said path substantially corresponding to said charge velocity divided by said oscillation frequency and multiplied by a charge transit angle in cycles which differs from the phase angle in cycles corresponding to said given phase relation by an odd number of half cycles, whereby input frequency components of current induced in said resonator by passage of charges past said second-named velocity variation means are equal and opposite to input frequency components of current induced in said resonator by passage of charges past said first-named velocity variation means, and means disposed along said path beyond said second-named velocity variation means for abstracting input frequency energy from density variations of said stream which are due to drift action between said first-named velocity variation means and said second-named velocity variations means.

2. High frequency translating apparatus comprising means within an enclosing envelope for projecting a stream of moving charges at substantially uniform velocity along a prescribed path, signal input means disposed in the path of said stream, which input means comprises charge-permeable electrodes defining a pair of input gaps spaced apart along said path and means for producing signal frequency fields across said gaps in a given phase relation to each other with reference to the direction of travel of said stream and signal output means disposed along said path beyond said input means, the distance along said path between said input gaps substantially corresponding to said charge velocity divided by said signal frequency and multiplied by a charge transit angle in cycles which differs from the phase angle in cycles corresponding to said given phase relation by an odd number of half cycles, whereby velocity variations imparted to said stream in said first input gap are substantially nullified by equal and opposite velocity variations imparted to said stream in said second input gap.

3. High frequency translating apparatus comprising means within an enclosing envelope for projecting a stream of moving charges along a prescribed path at substantially uniform velocity, signal input means disposed in the path of said stream, which input means comprises charge-permeable electrodes defining a pair of input gaps spaced apart along said path, a resonator coupled to said gaps whereby application of a signal to said resonator produces signal frequency voltages across said gaps in phase opposition to each other with reference to the direction of travel of said stream, the spacing between said gaps substantially corresponding to said charge velocity multiplied by the time corresponding to the period of an integral number of whose cycles at the signal frequency, whereby velocity variations imparted to the stream at one input gap are nullified by velocity variations at the second input gap, and means spaced along said path beyond said input means for abstracting signal frequency energy from said stream.

4. High frequency translating apparatus comprising means within an enclosing envelope for projecting a stream of moving charges along a prescribed path at substantially uniform velocity, signal input means disposed in the path of said stream, which input means comprises charge-permeable electrodes defining a pair of input gaps spaced apart along said path, a resonator coupled to said gaps whereby application of a signal to said resonator produces signal frequency voltages across said gaps in phase with each other with reference to the direction of travel of said stream, the spacing between said gaps substantially corresponding to said charge velocity multiplied by the time corresponding to the period of an odd number of half cycles at the signal frequency, whereby velocity variations imparted to the stream at one input gap are nullified by velocity variations at the second input gap, and means spaced along said path beyond said input means for abstracting signal frequency energy from said stream.

5. High frequency translating apparatus comprising means within an enclosing envelope for projecting a stream of moving charges along a prescribed path at substantially uniform velocity, signal input means disposed in the path of said stream, which input means comprises charge-permeable electrodes defining a pair of input gaps spaced apart along said path, an input resonator coupled to both of said gaps whereby application of a signal to the said input resonator produces signal frequency voltages across said gaps in a given phase relation to each other with reference to the direction of travel of said stream and whereby current is induced in the input resonator by the passage of charges across said input gaps, and signal output means disposed along said path beyond said input means, the distance between said gaps along said path substantially corresponding to said charge velocity divided by said signal frequency and multiplied by a charge transit angle in cycles which differs from the phase angle in cycles corresponding to said given phase relation by an odd number of half cycles, whereby the components, at the frequency to which said input resonator is resonant, of current induced in said resonator by passage of charges across said second gap are equal and opposite to the components, at said resonant frequency, of the current induced in said input resonator by passage of charges across said first gap.

6. High frequency translating apparatus which comprises means within an enclosing envelope for projecting a stream of moving charges along a prescribed path at substantially uniform velocity, means disposed along said path for imparting velocity variations to said stream in accordance with a high frequency signal, means disposed along said path beyond said first-named velocity variation means for imparting to said stream velocity variations which are equal in magnitude to said first-imparted variations and in a given phase relation thereto, the distance between the two said velocity variation means along the said path substantially corresponding to said charge velocity divided by the frequency of said signal and multiplied by a transit angle in cycles which differs from the phase angle in cycles corresponding to said given phase relation by an odd number of half cycles, whereby said stream emerges from said second-named velocity variation means substantially devoid of velocity variations but with density variations due to drift between said first-named velocity variation means and said second-named velocity variation means, and means disposed along said path beyond said second-named velocity variation means for abstracting signal frequency energy from said density variations.

7. High frequency translating apparatus comprising means within an enclosing envelope for projecting a stream of electrons along a prescribed path at a substantially uniform velocity, signal input means disposed in the path of said stream, which input means comprises electron-permeable electrodes defining a pair of input gaps spaced apart along said path, a resonator coupled to said gaps whereby application of a signal to the said resonator produces signal frequency voltages across said gaps in a given phase relation to each other with reference to the direction of travel of said stream, the distance along said path between said gaps substantially corresponding to said electron velocity divided by said signal frequency and multiplied by an electron transit angle in cycles which differs from the phase angle in cycles corresponding to said given phase relation, by an odd number of half cycles, whereby velocity variations imparted to the stream at one input gap are nullified by velocity variations at the second input gap and means spaced along said path beyond said input means for abstracting signal frequency energy from said stream.

8. High frequency translating apparatus comprising means within an enclosing envelope for projecting a stream of electrons along a prescribed path at a substantially uniform velocity, signal input means disposed in the path of said stream, which input means comprises electron-permeable electrodes defining a pair of input gaps spaced apart along said path, a resonator coupled to said gaps whereby application of a signal to the said resonator produces signal frequency voltages across said gaps in a given phase relation to each other with reference to the direction of travel of said stream, the distance along said path between said gaps measured in cycles of electron transit angle differing from the phase angle in cycles corresponding to the said phase relation by substantially an odd number of half cycles, whereby velocity variations imparted to the stream at one input gap are nullified by velocity variations at the second input gap and means spaced along said path beyond said input means for abstracting signal frequency energy from said stream.

9. High frequency translating apparatus comprising means within an enclosing envelope for projecting a stream of electrons along a prescribed path at a substantially uniform velocity, signal input means disposed in the path of said stream, which input means comprises electron-permeable electrodes defining a pair of input gaps spaced apart along said path, a resonator coupled to said gaps whereby application of a signal to said resonator produces signal frequency voltages across said gaps in a given phase relation to each other with reference to the direction of travel of said stream, the distance along said path between said gaps being substantially according to the equation $$d = \frac{v\Phi \pm N\pi}{\omega}$$

where $d$ = distance between the input gaps,
$v$ = electron velocity between the input gaps,
$\Phi$ = phase angle in radians corresponding to the said phase relation of the signal voltages across the input gaps,
$N$ = any odd integer,
$\pi$ = 3.1416
$\omega$ = angular velocity at the signal frequency, whereby velocity variations imparted to the stream at one input gap are nullified by velocity variations at the second input gap.

JOHN R. PIERCE.

REFERENCES CITED

The following references are of record in the file of this patent:

UNITED STATES PATENTS

| Number | Name | Date |
|---|---|---|
| 2,222,902 | Hahn | Nov. 26, 1940 |
| 2,242,249 | Varian et al. | May 20, 1941 |
| 2,243,537 | Ryan | May 27, 1941 |
| 2,245,627 | Varian | June 17, 1941 |
| 2,250,511 | Varian et al. | July 29, 1941 |
| 2,253,080 | Maslov | Aug. 19, 1941 |
| 2,259,690 | Hansen et al | Oct. 21, 1941 |
| 2,280,824 | Hansen et al | Apr. 28, 1942 |
| 2,293,180 | Terman | Aug. 18, 1942 |
| 2,295,680 | Mouromtseff et al. | Sept. 15, 1942 |
| 2,309,966 | Litton | Feb. 2, 1943 |
| 2,311,658 | Hansen et al. | Feb. 23, 1943 |
| 2,367,295 | Llewellyn | Jan. 16, 1945 |